(No Model.)
J. B. WILLIAMS.
SEEDING MACHINE.
No. 503,274. Patented Aug. 15, 1893.
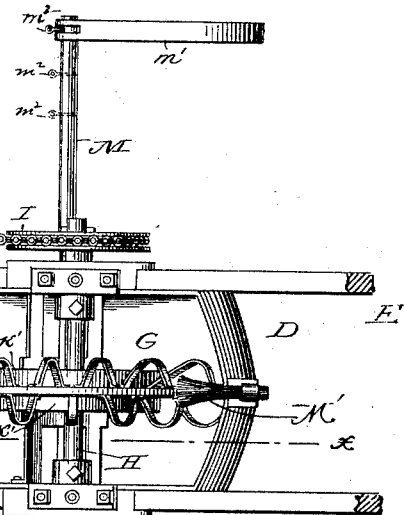
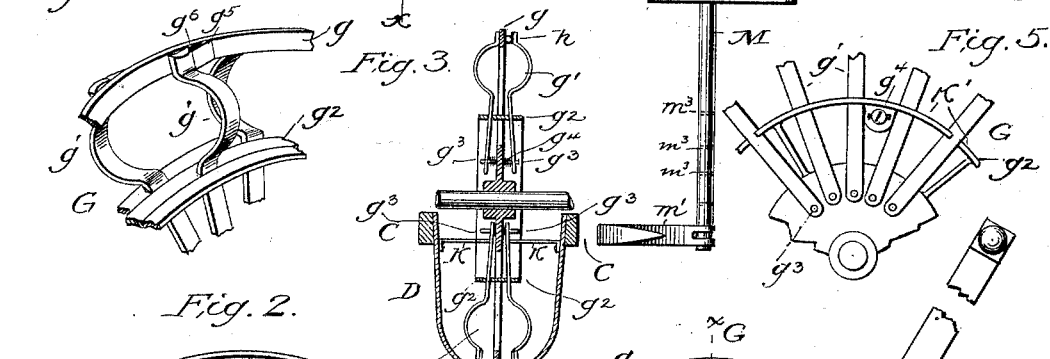
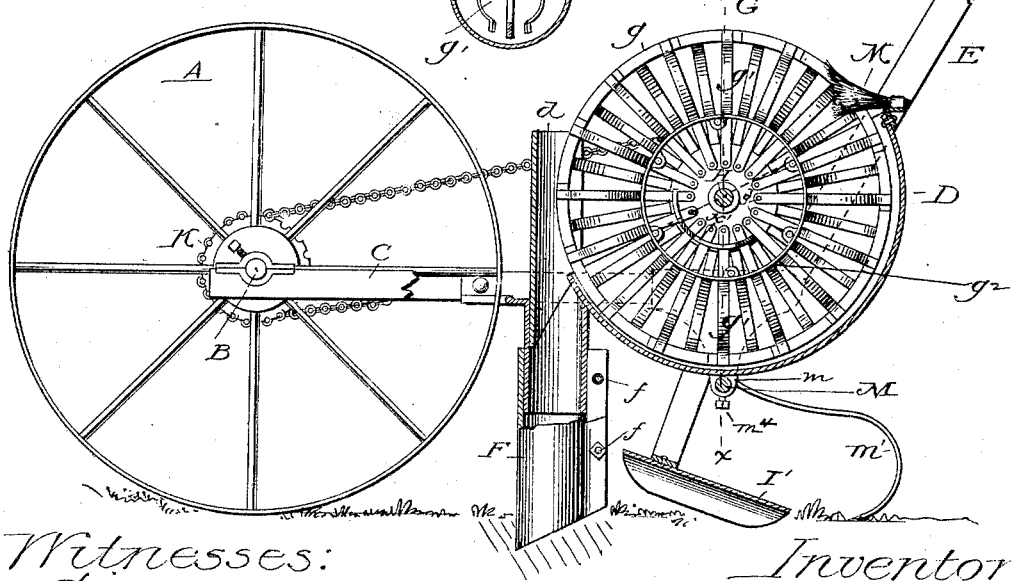
Witnesses:
Fabius S. Elmore
G. M. Copenhaver
Inventor:
J. B. Williams
By P. T. Dodge
Atty

UNITED STATES PATENT OFFICE.

JAMES B. WILLIAMS, OF GLASTONBURY, CONNECTICUT.

SEEDING-MACHINE.

SPECIFICATION forming part of Letters Patent No. 503,274, dated August 15, 1893.

Application filed April 13, 1893. Serial No. 470,207. (No model.)

*To all whom it may concern:*

Be it known that I, JAMES B. WILLIAMS, of Glastonbury, county of Hartford, and State of Connecticut, have invented a new and useful Improvement in Seeding-Machines, of which the following is a specification.

This invention relates to seed-dropping mechanism of the type represented in Letters-Patent No. 375,036, granted to me on the 20th day of December, 1887, in which the seed is grasped by fingers on a vertically-revolving wheel and carried from a hopper to the delivery point and then released.

My mechanism may be used in series in corn-planters, grain drills and other machines planting two or more rows at one time, but for the purpose of illustration I have shown the same embodied in a hand machine planting a single row.

In the accompanying drawings,—Figure 1 is a top plan view of the machine with the handles broken away in part. Fig. 2 is a side elevation of the machine with parts in section on the line $x$—$x$ Fig. 1. Fig. 3 is a vertical central cross-section on the line $x$—$x$, Fig. 2. Fig. 4 is a perspective view of a part of the periphery of the feed wheel. Fig. 5 is a side view of a section of the central part of the wheel.

Referring to the drawings,—A, represents a ground wheel fastened to axle B, turning in bearings on the forward ends of side bars C, which are bolted at their rear ends to the sides of the cast metal hopper D. Two handles E, extending upward and rearward are also bolted to this hopper as a means of propelling and directing the machine. The hopper bottom is of substantially semi-circular form from front to rear, that it may closely embrace the lower portion of the feed wheel and is provided at the front with a discharge spout, $d$, in such position that the seed must be lifted thereto. The lower end of this spout is encircled by a vertically-adjustable hoe or tube F, which serves to open the furrow and conduct the seed thereto. This hoe is vertically divided, and is contracted by screws $f$ uniting its edges, so that it is held in place by frictional contact with spout $d$.

G is the feed wheel mounted in the hopper on shaft H, which is provided with driving pulley I, connected by chain J, to the pulley K, mounted loosely on the axle B, and provided on the side with inclined teeth forced into engagement with clutch L on the axle, by a spring M. This arrangement permits the parts to uncouple and the feed wheel to stand at rest when the machine is drawn backward.

The feed wheel consists mainly of a skeletonized disk $g$, fixed on the shaft, and a series of radial laterally movable fingers, $g'$, which grasp the seed between their outer ends and the side faces of the disk. These are arranged alternately on opposite sides of the wheel and operate independently of each other. Each finger midway of its length passes through, and is fulcrumed in, an annular flange $g^2$, forming part of the wheel, and at its inner end is seated loosely over a stud $g^3$, and against a helical spring $g^4$, thereon. The springs act to force the inner ends of the fingers outward laterally from the wheel and thereby force their outer ends toward the rim of the disk, that it may grasp and hold the seed as shown at $h$, Fig. 3.

K', K', are two cam plates secured to the inner walls of the hopper with their inner ends lying close to the sides of the wheel and so shaped as to act against the inner ends of the seed-retaining fingers $g'$. As the wheel revolves the lower ends of the fingers are caused to sweep through the seed in the hopper. As each finger enters the seed its inner end rides against the cam K', and its outer end is thereby lifted from the side of the disk so that seed may enter between them. Just before the finger rises from the mass of seed it leaves the cam and is closed by the spring against a seed which is carried upward and forward thereby until it arrives at a point above the spout where the cam encounters the finger and causes it to release the seed which falls through the spout to the furrow. The outer ends of the fingers are preferably made as shown with a lip or shoulder $g^5$, on one edge and the disk provided with opposing shoulders $g^6$, to assist in holding the seed. These features are of special importance when two or more seeds are to be delivered at a time. The ends of the fingers may be modified in form at will according to the character and quality of seed to be delivered. The fingers are curved outward from the disk near their outer ends as shown, in order that they may more effectually agitate the seed and that the seed may enter the more readily between their ends and the disk. I make the fingers of elastic metal so that their inner ends may be sprung from the guide pins and the fingers withdrawn endwise. This admits of the fingers being quickly replaced by others of different size or form to adapt the machine for distributing another kind of seed, and it also reduces the labor and expense of assembling the parts in the first instance.

In order to adapt the machine for different classes of seed, it is desirable to adjust the fingers in the direction of rotation to or from the shoulders $g$, on the disk. This is accomplished as shown in Fig. 5, by securing the flanges $g^2$, in which the fingers are seated, to the hub of the disk by screws $g^4$, passing through slotted ears in the flanges so that the latter may be turned slightly forward or backward.

For the purpose of covering the seed I use a scraper or wiper I', attached by rigid arms to the hopper and located behind the seed spout.

In order to prevent the fingers from grasping the seed in an uncertain manner, and to remove any surplus seed which may be carried up by the fingers, I fix a brush or wiper M' to the hopper in position to act on the rear side or edge of the wheel.

For the purpose of marking the ground I extend through depending ears $m$ on the sides of the frame a transverse rod, M, projecting at both sides, and provided at each end with a gravitating marking finger, $m'$. Each of these fingers is free to turn upward out of action and is secured against lateral motion by a pin, $m^2$, passing through a slot in the finger into the sustaining rod. The pin also serves as a rest to sustain the finger when turned out of action, as shown on the left side of the machine in Fig. 1. The rod is provided at each end with a series of the pin-receiving holes $m^3$, in order to admit of the finger being adjusted to and from the machine according to the distance which is to separate the rows. When the distance between the rows is to be unusually great the rod may be moved endwise and projected entirely on one side of the machine. A set screw $m^4$, holding the rod against end motion permits this adjustment when required.

Having thus described my invention, what I claim is—

1. In combination with the hopper, the rotary disk, the seed grasping fingers fulcrumed thereon, the springs to close said fingers, and the cams arranged to act on their inner ends to rock them on their fulcra.

2. In combination with an opening cam, a rotary disk, seed-grasping fingers inserted through and fulcrumed in openings in the disk, pins on which the fingers are guided and by which their withdrawal is prevented, and springs seated on said pins and acting to close the fingers, substantially as described and shown.

3. The rotary disk with seed supporting shoulders, in combination with seed-grasping fingers operating substantially as described, and annular flanges in which the fingers are fulcrumed, said rings secured to the disk and adapted for limited rotary adjustment thereon substantially as described whereby the relation of the fingers to the shoulders on the disk may be varied at will.

4. The feed wheel consisting of the disk, its flange with openings therein, and the pins in combination with the springs, and the elastic fingers inserted through the openings and sprung into place upon the pins against the springs.

In testimony whereof I hereunto set my hand, this 23d day of January, 1893, in the presence of two attesting witnesses.

JAMES B. WILLIAMS.

Witnesses:
W. R. KENNEDY,
FABIUS S. ELMORE.